United States Patent
Oeuvrard et al.

(10) Patent No.: US 9,649,978 B2
(45) Date of Patent: May 16, 2017

(54) BACKLIT INTERIOR STRUCTURE OF A VEHICLE

(75) Inventors: Jean-François Oeuvrard, Cergy-Pontoise (FR); Pierre Guerreiro, Eaubonne (FR)

(73) Assignee: Faurecia Interieur Industrie, Nanterre (FR)

( * ) Notice: Subject to any disclaimer, the term of this patent is extended or adjusted under 35 U.S.C. 154(b) by 0 days.

(21) Appl. No.: 14/235,073

(22) PCT Filed: Jul. 24, 2012

(86) PCT No.: PCT/EP2012/064542
§ 371 (c)(1),
(2), (4) Date: Jan. 26, 2014

(87) PCT Pub. No.: WO2013/014171
PCT Pub. Date: Jan. 31, 2013

(65) Prior Publication Data
US 2014/0177248 A1 Jun. 26, 2014

(30) Foreign Application Priority Data
Jul. 26, 2011 (FR) .................... 11 56800

(51) Int. Cl.
*B60Q 1/26* (2006.01)
*B60Q 3/04* (2006.01)
*B60Q 3/00* (2017.01)
*B60Q 3/02* (2006.01)
(Continued)

(52) U.S. Cl.
CPC .............. *B60Q 3/04* (2013.01); *B60Q 3/004* (2013.01); *B60Q 3/0283* (2013.01); *B60R 13/0256* (2013.01); *D03D 15/00* (2013.01); *B60Q 2500/10* (2013.01); *B60R 2013/0287* (2013.01); *D10B 2401/20* (2013.01); *Y10T 29/49002* (2015.01)

(58) Field of Classification Search
CPC .............. B60Q 2500/10; B60Q 3/0283; Y10T 428/24802
USPC .................................................. 362/459–549
See application file for complete search history.

(56) References Cited

U.S. PATENT DOCUMENTS 4,234,907 A * 11/1980 Daniel .......................... 362/556
4,977,487 A * 12/1990 Okano .......................... 362/555
(Continued)

FOREIGN PATENT DOCUMENTS

| EP | 2060444 A1 | 5/2009 |
|---|---|---|
| EP | 2072332 A1 | 6/2009 |
| FR | 2920717 A1 | 3/2009 |

(Continued)

OTHER PUBLICATIONS

International Search Report for PCT/EP2012/064542, dated Aug. 31, 2012, 3 pages (translated).

*Primary Examiner* — William Carter
(74) *Attorney, Agent, or Firm* — Reising Ethington P.C.

(57) ABSTRACT

This structure comprises:
an internal structure (3);
an external covering (5) connected to the internal structure (3), the external covering (5) having at least one translucent area (37);
a light source (7);
The light source (7) comprises a flexible fabric (25) in which is interwoven a plurality of optical fibers (29), clamped against an internal face (15) of the external covering (5) that faces the internal structure (3).

16 Claims, 3 Drawing Sheets

(51) Int. Cl.
*D03D 15/00* (2006.01)
*B60R 13/02* (2006.01)

(56) References Cited

U.S. PATENT DOCUMENTS

2008/0025039 A1* 1/2008 Guillermo ............... 362/556
2010/0214795 A1* 8/2010 Salter et al. ............ 362/488

FOREIGN PATENT DOCUMENTS

| FR | 2937929 A1 | 5/2010 |
| FR | 2941514 A1 | 7/2010 |

* cited by examiner

BACKLIT INTERIOR STRUCTURE OF A VEHICLE

TECHNICAL FIELD

The invention generally relates to back-lit interior structures of a vehicle.

More specifically, the invention according to a first aspect relates to a vehicle interior structure, the structure being of the type comprising:
- an internal structure;
- an external covering connected to the internal structure, the covering having at least one translucent area;
- a light source.

BACKGROUND

Positioning the light source in a cavity formed in the internal structure is known, the cavity having towards the passenger compartment of the vehicle an aperture covered by the translucent area of the covering. When the light source is active, the light emitted by this source passes through the translucent area, which gives the possibility of creating a bright decor on the interior structure, visible from the passenger compartment of the vehicle.

Such a layout of the light source cannot be achieved when the internal structure is provided for absorbing an impact, for example a head impact of the passenger according to the regulations ECE 21. Indeed, the area including the cavity in which the light source is placed, does not have sufficient resistance to depression for absorbing the energy of the impact.

SUMMARY

In this context, the invention aims at proposing a vehicle interior structure with a back-lit covering, which may meet the regulatory requirements as regards impact absorption, notably absorption of a head impact of the passenger.

For this purpose, the invention deals with a vehicle interior structure of the aforementioned type, characterized in that the light source is a flexible fabric in which is interwoven a plurality of optical fibers, clamped against an internal face of the external covering turned towards the internal structure.

Such a light source has a small thickness, so that it may be implanted in the interstice between the external covering and the internal structure, without having to generate a cavity of substantial depth. Such a cavity reduces the capability of the internal structure of cushioning an impact, notably an impact of the head type. It is thus possible to limit the thickness of the interstice separating the external covering from the internal structure.

The interior structure is typically a dashboard, or a dashboard portion, located at right angles to the front passenger seat.

In this case, the internal structure typically corresponds to a stiff portion of the dashboard cowl. This stiff portion is for example injected in a stiff plastic material, for example in polypropylene. It defines the general shape of the cowl, because of its stiffness.

The external covering is a decorative covering which covers the internal structure. It forms a visible portion of the interior structure. The external covering is a flexible part which adapts to the shape of the internal structure.

The external covering typically consists of several layers of plastic material positioned on each other, as described later on.

Light source comprises, in addition to the flexible fabric, a light generating unit, the light being transmitted by the optical fibers of the flexible fabric. The light generating unit is for example a set of diodes of the LED (Light-Emitting Diode) type or a single diode, or neon lighting, or an incandescent bulb, or any other type of light-emitting unit.

The flexible fabric comprises textile fibers and optical fibers interwoven with each other. The fabric typically includes a large number of optical fibers is distributed on the major portion of the surface of the external covering. The textile fibers are interwoven with each other and with the optical fibers in order to hold the optical fibers in place. The textile fibers and these optical fibers may be interwoven with each other in all sorts of ways. For example they may be woven with each other, knitted with each other, etc. for example, the textile fibers are weft yarns of the fabric, and the optical fibers are warp yarns of the fabric. Documents FR-2 859 736 and FR-2 859 737 for example describe such a fabric.

The optical fibers are laid out in order to allow scattering of the light towards the external covering. For example, the side of the optical fibers turned towards the external covering is provided for allowing scattering of the light out of the optical fiber. Alternatively, the optical fibers are laid out so that the side of the optical fiber, opposite to the external covering, allows scattering of the light, the fabric in this case including a reflector provided for sending back the light emitted by the optical fibers towards the external covering.

The flexible fabric is clamped against the internal face of the external covering, in the sense that the flexible fabric is in contact over the major portion of its surface with the internal face of the external covering, typically via an adhesive layer. Alternatively, the flexible fabric is directly clamped against the internal face on the major portion of its surface without any intermediate. Still alternatively, the flexible fabric is slightly moved away from the internal face and this on the major portion of its surface.

Advantageously, the light source is located in an area where the internal structure is laid out for cushioning a statutory impact, for example an impact of the head type according to the regulations ECE 21. The internal structure, at right angles to the light source, is therefore provided for deforming in the case of an impact, other the effect of the impact of the body of one of the occupants of the vehicle. The internal structure is provided for absorbing a portion of the impact energy by deforming, according to the regulations in effect.

Alternatively, the internal structure at right angles to the light source is not provided for absorbing a statutory impact.

The statutory impact may be of any type, such as the impact generated by a poorly secured object during braking, or other circumstance.

Preferably, the internal structure has an external face turned towards the external covering, the internal and external faces being separated from each other by an interstice with a thickness of less than 10 mm in which is housed the light source. Thus, the thickness of the interstice does not lower the absorption capability of the interior structure in the case of an impact. This moreover allows a gain in space, allowing the other components of the interior structure to be housed more easily. Typically the thickness of the interstice is less than 5 mm and for example has the value of 3 mm.

The flexible fabric as for it has a thickness of less than 5 mm, preferably less than 3 mm, and for example having the value of 1 mm.

The small thickness of the flexible fabric allows a gain in space. Moreover this contributes to obtaining an efficient behavior of the internal structure for cushioning the impacts, if necessary.

The fact that the interstice between the internal and external faces is small also gives the possibility of reducing as much as possible the distance between the flexible fabric and the external face of the internal structure, so that the depression of the external covering under the effect of pressure applied by a user, for example manually, is limited. This imparts an impression of good quality to the user.

The external covering typically includes a translucent supporting layer, and an opaque paint layer.

The translucent supporting layer extends over the quasi-totality of the external covering. For example it is made in acrylonitrile-butadiene-styrene/polycarbonate (ABS/PC), in polycarbonate (PC), in polypropylene (PP) or in polymethyl methacrylate (PMMA). The supporting layer is typically non-tinted, but may also incorporates colored pigments. The paint layer typically covers the quasi-totality of the supporting layer except for the translucent areas of the covering. The covering has one or several translucent areas. The translucent area(s) typically form(s) a pattern, for example a decorative pattern. The translucent area(s) is(are) obtained for example according to a method in which the whole surface of the translucent supporting layer is covered with paint and the paint is then removed in the translucent areas. The removal step is typically carried out by means of a laser.

The paint layer is typically positioned on the external face of the supporting layer, i.e. on the face turned towards the passenger compartment of the vehicle. Alternatively, the paint layer is positioned on the internal face. The paint layer is adapted so as to have a transmission level of the light emitted by the optical fibers of less than 50%, in the non-translucent areas of the covering. Preferably the transmission level is less than 30% and still preferably less than 10%.

As indicated above, the flexible fabric is advantageously attached on the internal face with an adhesive, having a transmission level of the light emitted by the light source of more than 30%. Preferably, the transmission level is greater than 50%, and still preferably greater than 70%.

The adhesive may be a layer of glue or an adhesive film. The adhesive for example has a thickness of 0.5 mm.

The external covering has on a visible face opposite to the internal face, a layer of varnish having a light transmission level of more than 10%. Preferably this transmission level is greater than 50% or still preferably is greater than 70%.

Varnish has anti-UV protective properties, for protecting the supporting layer from aging. For example the paint is located between the supporting layer and the varnish layer.

According to a second aspect, the invention relates to a set of interior structures comprising at least one back-lit interior structure having the above characteristics, and at least one non-back-lit interior structure without any light source, the respective internal structures of the back-lit interior structure and of the non-back-lit interior structure being of identical shapes, the respective external coverings of the back-lit interior structure and of the non-back-lit interior structure of being of identical shapes. Thus, it is possible to manufacture back-lit and non-back-lit interior structures by means of the same injection molds. The back-lit and non-back-lit interior structures differ essentially by the fact that the back-lit interior structures include a light source, and the non-back-lit interior structures do not include one. This allows optimizing patient of the manufacturing costs of the interior structures and gives the possibility of proposing at a lesser cost, high-end back-lit interior structures, and low-end non-back-lit interior structures.

Moreover, the external covering of the back-lit structure includes a layer in a translucent material, while the same layer may be in an opaque material in a non-back-lit structure.

The ask race between the internal face of the external covering and the external face of the internal structure is slightly thicker for a non-back-lit structure than for a back-lit structure, because of the absence of the fabric.

According to an embodiment, the non-back-lit interior structure further comprises a plurality of ribs on the external face of the internal structure. Thus, in this case, the internal structure is of an identical shape for back-lit and non-back-lit interior structures, but the non-back-lit interior structure further has ribs positioned in the interstice between the internal face and the external face. These ribs allow reduction in the thickness of the air space located under the external covering. This is advantageous notably for energy absorption performances of the internal structure in the case of impact. This is also advantageous for the depression of the external covering under the effect of pressure for example exerted by a user.

According to a third aspect, the invention deals with a method for manufacturing an assembly having the above characteristics, the method comprising at least the following steps:

manufacturing two parts of identical shapes each comprising an internal structure and a plurality of ribs on the external face of the internal structure;

manufacturing the non-back-lit interior structure from one of the two parts;

suppressing the ribs of the other one of the two parts and manufacturing the back-lit interior structure from said other one of the two parts.

Thus, it is possible to use the same mold for manufacturing the internal structure of the back-lit interior structure and that of the non-back-lit interior structure. The ribs are then suppressed for the back-lit version. This is particularly economical. The suppression may be achieved in all kinds of ways. For example it is achieved by moving milling or machining or any other mechanical means.

BRIEF DESCRIPTION OF THE DRAWINGS

Other features and advantages of the invention will become apparent from the detailed description which is given thereof below, as an indication and by no means as a limitation, with reference to the appended figures, wherein.

DESCRIPTION OF THE ILLUSTRATED EMBODIMENT(S)

Figure 1:
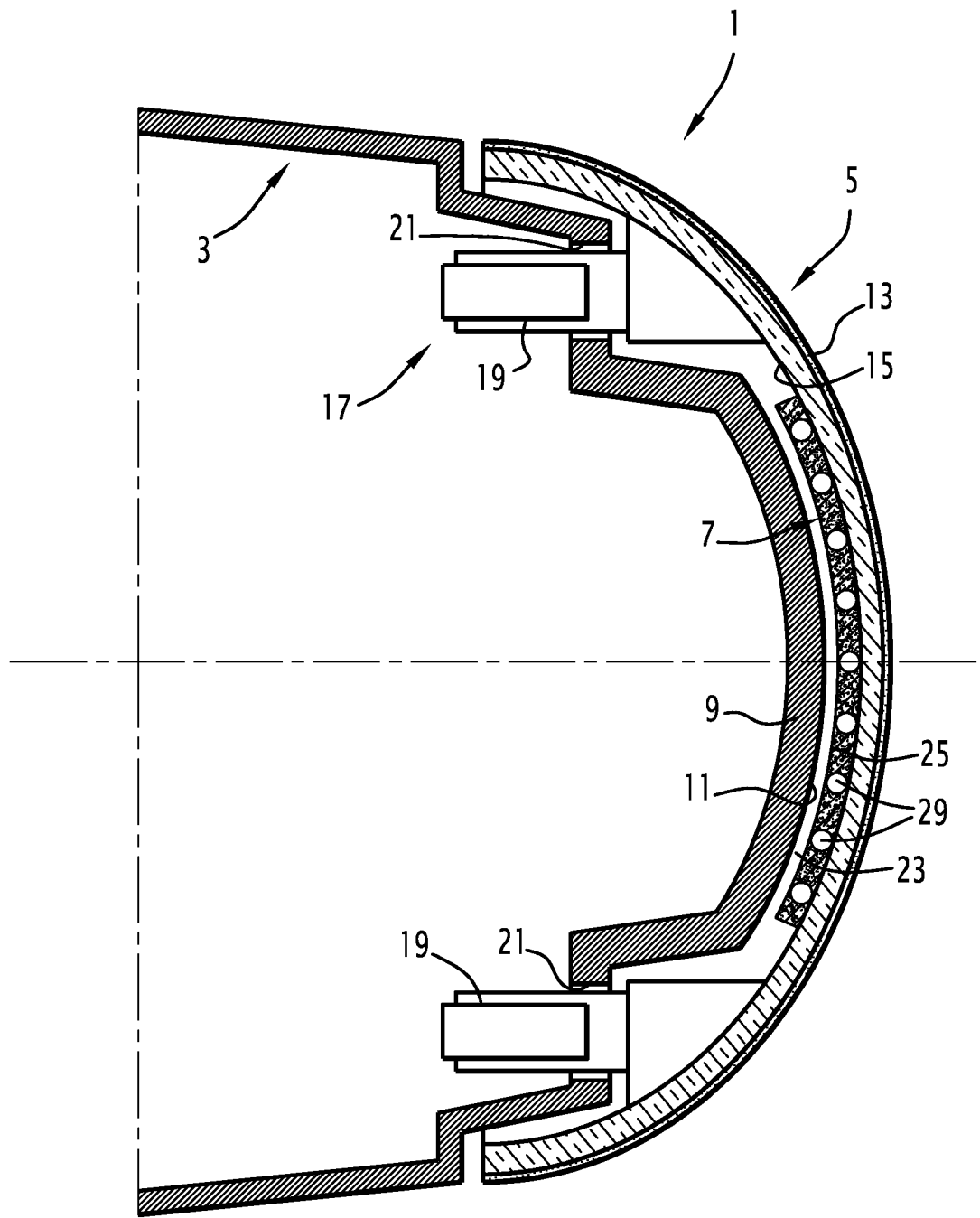
FIG. 1 is a sectional view in a longitudinal and vertical plane of a back-lit interior structure according to the invention.

The interior structure 1 illustrated in FIG. 1 is a dashboard. Only the cowl of the dashboard is illustrated. The interior structure comprises an internal structure 3, and external covering 5 connected to the internal structure, and a light source 7. The internal structure 3 is a shell in injected plastic material, typically in polypropylene. It includes an area 9 laid out for cushioning a statutory impact of the head type, according to the regulations ECE 21. The area 9 has a convex external face 11, turned towards the external covering 5.

The external covering 5 is a flexible decor part. The covering 5 covers the internal structure 3. It has a visible face 13, turned towards the passenger compartment of the vehicle, and an internal face 15 turned towards the internal structure 3. The faces 13 and 15 are large faces of the covering 5 opposite to each other.

The structure includes a connection 17 of the external covering 5 to the internal structure 3. The connection 17 for example comprises tabs 19 secured to the covering, snap-fastened into orifices 21 of the internal structure 3. The external covering 5 and the internal structure 3 are laid out so that there exists an interstice 23 between the external face 11 and the internal face 15.

The light source 7 comprises a light generating unit, not shown, and a flexible fabric positioned in the interstice 23. The light generating unit is for example comprises a plurality of diodes of the LED type.

The flexible fabric 25 comprises textile fibers and optical fibers interwoven with each other. The optical fibers are referenced as 29 in FIG. 1. The optical fibers 29 are distributed over the whole surface of the flexible fabric. The flexible fabric 25 is clamped against the internal face 15 of the covering.

The interstice 23 for example has a thickness equal to 3.2 mm. The flexible fabric 25 for example has a thickness with a value of about 1.2 mm. Thus, there subsists between the flexible fabric 25 and the external face 11 an air space having a thickness with the value of about 2 mm.

The flexible fabric is laid out in order to project a light through the external covering 5, towards the passenger compartment of the vehicle.

Figure 3:
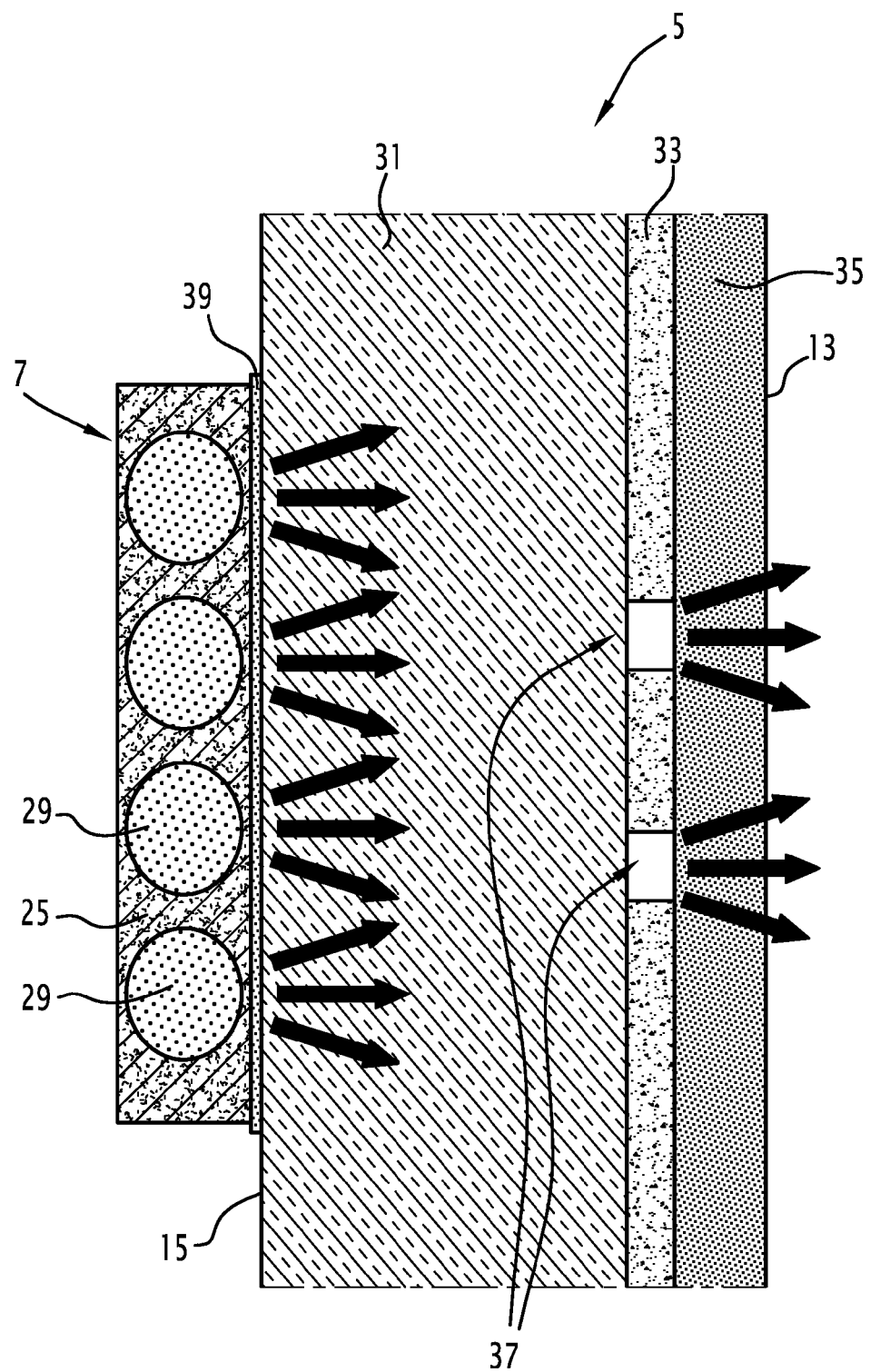
FIG. 3 is a simplified schematic sectional illustration of the external covering and of the light source of the structure of FIG. 1.

The structure of the external covering 5 is illustrated in FIG. 3.

The external covering 5 comprises a translucent supporting layer 31, an opaque paint layer 33 and a transparent varnish layer 35. The paint layer 33 is inserted between the supporting layer 31 and the varnish layer 35. The supporting layer 31 is made in a translucent non-tinted material, for example ABS/PC.

The paint is opaque, and has a transmission level of the light emitted by the light source of less than 50%. The paint layer 33 is interrupted in certain areas 37, the areas 37 therefore forming translucent areas of the external covering 5 through which the light emitted by the light source 7 may scatter through the external covering 5. The areas 37 typically form a decorative pattern which is illuminated when the light source 7 is active.

The transparent varnish layer 35 entirely covers the paint layer 33 and the areas 37. It forms the surface layer of the external covering. The varnish has anti-UV protection properties, and protects the supporting layer 31 against aging due to exposure to solar radiation. The light transmission level of the transparent varnish layer is greater than 50%.

Typically, the areas 37 are obtained in two steps. During a first step, the translucent supporting layer is entirely covered by the paint layer 33. During a second step, the paint is removed from the areas 37 by means of a laser driven by a computer.

As visible in FIG. 3, the flexible fabric 25 is clamped against the internal face 15 by the interior of a layer of glue 39. The glue has a high transmission level of light emitted by the light source, for example of more than 50%. The thickness of the layer of glue is for example 0.5 mm.

The invention also covers an assembly of interior structures, with at least the one back-lit interior structure as described above, and a non-back-lit interior structure without any light source. In this case, the non-back-lit interior structure includes an internal structure and an identical external covering of shapes respective to the internal structure and to the external covering of the back-lit interior structure. On the other hand, the non-back-lit interior structure does not include any light source. Notably it does not include any flexible fabric interposed between the internal face 15 and the external face 11 in the interstice 23. The air space located between the internal face of the external face is therefore thicker than for a back-lit interior structure.

Figure 2:
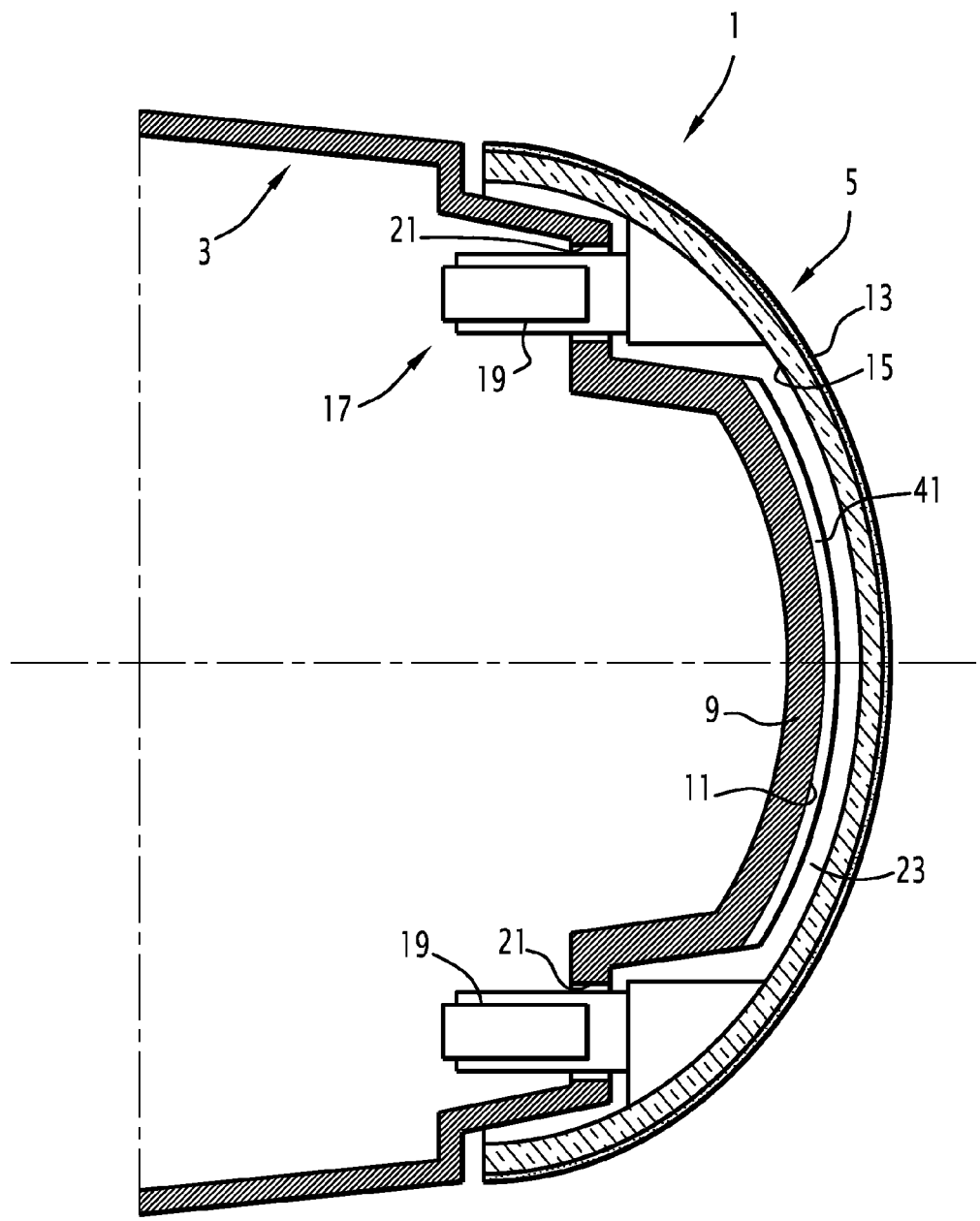
FIG. 2 is a similar view to the one of FIG. 1, for a non-back-lit interior structure.

FIG. 2 illustrates a non-back-lit interior structure for an assembly of interior structures according to a second embodiment of the invention.

Only the points by which this second assembly differs from the first assembly will be detailed below. Identical elements or ensuring the same function in both embodiments will be designated with the same references.

In this second assembly, the back-lit interior structure is identical with the one of the first assembly.

On the other hand, the non-back-lit interior structure comprises a plurality of ribs 41, borne by the external surface 11. These ribs are for example made with the internal structure 3 in the same material. The ribs 41 reduced the thickness of the air space located under the covering. For example, the air space between the edges of the ribs 41 and the internal face 15 has a thickness of the order of 2 mm. It is thus of the same order as the thickness of the air space separating the flexible fabric 25 from the external face 11, for the back-lit interior structures.

The ribs 41 are distributed over the whole surface of the external face 11. They extend for example over the whole height of the external face 11.

The method for manufacturing the second assembly of interior structures will now be described. During a first step, a series of parts with identical shapes is manufactured, said parts each comprising an internal structure 3 and ribs 41 on the external face 11 of the internal structure.

Next, non-back-lit interior structures are manufactured from a portion of the parts by mounting a covering on the internal structure via the connection 17. The covering 5 does not bear any fabric 25.

Moreover, back-lit interior structures are manufactured from other parts. For this, the ribs 41 are suppressed by milling. The external covering 5 is then mounted on the internal structure 3, via the connection 17. Before setting into place the covering 5, a flexible fabric 5 is attached onto the internal face 15 of the covering.

Here again, the covering 5 has an identical shape for back-lit structures and non-back-lit structures.

Alternatively, the back-lit interior structures are manufactured by a slightly different method. The corresponding internal structures are directly manufactured without the ribs. More specifically, the internal structures for the back-lit interior structures are injected into a mold comprising a removable block. Upon exiting the mold, they do not bear any rib 41. On the contrary, for back-lit interior structures, the same mold is used but without the removable block. The removable block obturates notches allowing the ribs 41 to be injected. Thus, upon exiting the mold, the internal structures for non-back-lit interior structures include ribs 41.

The invention claimed is:

1. A set of vehicle dashboards comprising a back-lit dashboard and at least one non-back-lit dashboard without any light source, the back-lit dashboard comprising:
an internal structure;
an external covering connected to the internal structure, the external covering having at least one translucent area; and
a light source;
wherein the light source comprises a flexible fabric in which is interwoven a plurality of optical fibers, clamped against an internal face of the external covering turned towards the internal structure;
wherein the light source is located in an area where the internal structure is laid out for cushioning a statutory impact, for example an impact of the head type according to the regulations ECE 21;
wherein the internal structure has an external face turned towards the external covering, the internal and external faces being separated from each other by an interstice with a thickness of less than 10 millimeters, in which is housed the flexible fabric;
wherein the respective internal structures of the back-lit dashboard and of the non-back-lit dashboard have identical shapes, and wherein the respective external coverings of the back-lit dashboard and of the non-back-lit dashboard have identical shapes; and
wherein the internal structure is a rigid part.

2. The set according to claim 1, wherein the interior structure of the back-lit dashboard is covered by the external covering;
wherein the external covering is a decorative covering part and has a visible face turned towards the passenger compartment of the vehicle; and
wherein said flexible fabric has at least a major portion of its surface facing the internal face of the external covering turned towards the internal structure.

3. The set according to claim 2, wherein the flexible fabric has a thickness of less than 5 millimeters.

4. The set according to claim 2, wherein the external covering comprises a translucent supporting layer and an opaque paint layer.

5. The set according to claim 2, wherein the flexible fabric is attached onto the internal face by an adhesive having a transmission level of the light emitted by the light source of more than 30%.

6. The set according to claim 2, wherein the visible face of the external covering is opposite to the internal face, and wherein the visible face of the external covering has a layer of varnish having a light transmission level of more than 10%.

7. The set according to claim 2, wherein the flexible fabric is in contact over the major portion of its surface with the internal face of the external covering.

8. The set according to claim 2, wherein the flexible fabric is directly in contact over the major portion of its surface with the internal face of the external covering.

9. The set according to claim 2, wherein the interstice extends along most of the internal face and most of the external face.

10. The set according to claim 2, wherein the external covering is self-supporting.

11. The set according to claim 1, wherein the non-back-lit interior structure further comprises a plurality of ribs on the external face of the internal structure.

12. A method for manufacturing a set according to claim 11, the method comprising at least the following steps:
manufacturing two identical parts each comprising an internal structure and a plurality of ribs on the external face of the internal structure;
manufacturing the non-back-lit interior structure from one of the two parts;
suppressing the ribs of the other one of the two parts and manufacturing the back-lit interior structure from said other one of the two parts.

13. The back-lit dashboard according to claim 1, wherein the internal structure is a rigid part of a dashboard cowl.

14. The set according to claim 1, wherein the internal structures of the back-lit dashboard and of the non-back-lit dashboard have respective external faces turned towards the external covering, the internal and external faces being separated from each other by an interstice with a thickness of less than 10 millimeters both in the back-lit dashboard and in the non-back-lit dashboard, the flexible fabric of the back-lit dashboard being located in said interstice.

15. The set according to claim 1, wherein the non-back-lit dashboard further comprises a plurality of ribs distributed over the whole surface of the external face of the internal structure.

16. The set according to claim 1, wherein the back-lit dashboard does not have ribs on the external face of the internal structure.

* * * * *